(12) United States Patent
Kanesaka et al.

(10) Patent No.: US 6,276,132 B1
(45) Date of Patent: Aug. 21, 2001

(54) EXHAUST GAS PURIFYING SYSTEM

(75) Inventors: Hiroyuki Kanesaka, Chiba; Hitoshi Onodera, Kanagawa; Katsuo Suga, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/609,903

(22) Filed: Jun. 30, 2000

(30) Foreign Application Priority Data

Jul. 2, 1999 (JP) .................................................. 11-188786

(51) Int. Cl.$^7$ ....................................................... F01N 3/00
(52) U.S. Cl. .................................. 60/286; 60/299; 60/301
(58) Field of Search .............................. 60/286, 299, 301

(56) References Cited

U.S. PATENT DOCUMENTS

| | | | |
|---|---|---|---|
| 4,109,461 | * 8/1978 | Fujitani et al. | 60/274 |
| 5,272,871 | * 12/1993 | Oshima et al. | 60/301 |
| 5,357,749 | * 10/1994 | Oshuga et al. | 60/286 |
| 5,412,946 | * 5/1995 | Oshima et al. | 60/301 |
| 5,939,037 | * 8/1999 | Hepburn et al. | 60/299 |
| 6,122,909 | * 9/2000 | Murphy et al. | 60/286 |
| 6,138,454 | * 10/2000 | Fournier et al. | 60/286 |

FOREIGN PATENT DOCUMENTS

| | | |
|---|---|---|
| 0510498 | * 10/1992 | (EP) . |
| 541 271 | 5/1993 | (EP) . |
| 764 459 | 3/1997 | (EP) . |
| 824 955 | 2/1998 | (EP) . |
| 935 055 | 8/1999 | (EP) . |
| 2600492 | 1/1997 | (JP) . |

OTHER PUBLICATIONS

Toyoda et al., "The Quantitative Analysis of Multi-reactions on SCR Process," Science and Technology in Catalysis, 1998, p. 363.

Ogura et al., "Selective Catalytic Reduction of Nitric Oxide with Methane on Pd/Co/H–ZSM–5 Catalysts," Third Tokyo Conference on Advanced Catalytic Science and Technology, TOCAT3, Program and Abstracts, 1998, p. 49.

Matsumoto et al., "NOx storage–reduction catalyst (NSR) catalyst) for automotive lean burn engines," International Symposium on Surface Nano–control of Environmental Catalysts and Related Materials ($6^{th}$ Iketani Conference), Tokyo, 1996, pp. 74–75.

* cited by examiner

Primary Examiner—Thomas Denion
Assistant Examiner—Diem Tran
(74) Attorney, Agent, or Firm—Foley & Lardner

(57) ABSTRACT

An exhaust gas purifying system for an internal combustion engine of an automotive vehicle. The exhaust gas purifying system comprises an exhaust gas composition regulating device for producing a low HC concentration reducing agent in a lean exhaust gas atmosphere where air-fuel ratio is leaner than a stoichiometric value. The exhaust gas composition regulating device is disposed in an exhaust gas passageway of the engine. The low HC concentration reducing agent is low in concentration of hydrocarbons to have an exhaust gas composition having a volume ratio of NOx/HC not less than 50 in the exhaust gas passageway immediately downstream of the exhaust gas composition regulating device. Additionally, a NOx treating catalyst is disposed in the exhaust gas passageway and located downstream of the exhaust gas composition regulating device. The NOx treating catalyst is arranged to reduce NOx in the presence of the low HC concentration reducing agent supplied from the exhaust gas composition regulating device. The exhaust gas composition of the low HC concentration reducing agent is obtained in the exhaust gas passageway immediately upstream of the NOx reducing catalyst.

14 Claims, 1 Drawing Sheet

EXHAUST GAS PURIFYING SYSTEM

BACKGROUND OF THE INVENTION

This invention relates to improvements in an exhaust gas purifying system for purifying exhaust gas or burnt gas discharged from a combustion device such as an internal combustion engine, a burner, a furnace or the like, and particularly to the improvements in the exhaust gas purifying system using a catalyst for reducing nitrogen oxides (NOx) in exhaust gas discharged under a lean-burn operation in which an air-fuel mixture leaner than a stoichiometric level is supplied the combustion device.

It is well known that a three-way catalyst was used to oxidize carbon monoxide (CO) and hydrocarbons (HC) and to reduce nitrogen oxides (NOx) contained in exhaust gas discharged from an internal combustion engine of an automotive vehicle or the like. The three-way catalyst can effectively function in a stoichiometric atmosphere (exhaust gas having a stoichiometric air-fuel ratio). However, such three-way catalyst cannot function to reduce nitrogen oxides in a lean atmosphere (exhaust gas having a leaner air-fuel ratio than the stoichiometric level). In this regard, a technique for reducing nitrogen oxides in the lean atmosphere has been made in Japanese Patent No. 2600492, which a NOx trap agent can trap NOx in the lean atmosphere and can release NOx by enriching air-fuel ratio of exhaust gas flowing to the NOx trap agent so as to reduce the released NOx.

SUMMARY OF THE INVENTION

However, in such a technique disclosed in Japanese Patent No. 2600492, it is required to periodically lower the oxygen concentration in exhaust gas so as to enrich air-fuel ratio of exhaust gas flowing to the oxygen absorbing agent, even under the lean-burn operation. This makes insufficient a fuel economy effect due to the lean-burn operation. Additionally, the above technique requires to supply HC and CO as a reducing agent to accomplish reduction of NOx in the lean atmosphere in order to cause NOx to release from the NOx trap agent and to reduce NOx. Accordingly, HC and CO which has not been consumed in the NOx reduction reaction is required to be oxidized under oxidation reaction or oxidized by using a three-way catalyst disposed downstream of the NOx trap catalyst. Here, such a three-way catalyst for oxidizing HC and CO is disposed downstream of the NOx trap catalyst and considerably far from the engine, and therefore the temperature of exhaust gas in contact with the three-way catalyst is unavoidably lowered, thereby making it impossible to exhibit a sufficient oxidizing performance for HC and CO. Particularly immediately after engine starting, sufficient oxidation of HC and CO is difficult to be made.

It is an object of the present invention to provide an improved exhaust gas purifying system which can effectively overcome drawbacks encountered in conventional exhaust gas purifying techniques and systems.

Another object of the present invention is to provide an improved exhaust gas purifying system which can effectively oxidize HC and CO and reduce NOx even in a lean (exhaust gas) atmosphere in which air-fuel ratio is leaner than a stoichiometric level.

A further object of the present invention is to provide an improved exhaust gas purifying system which can effectively oxidize HC and CO and reduce NOx, exhibiting a sufficient fuel economy improvement effect due to a lean-burn operation of an internal combustion engine.

A still further object of the present invention is to provide an improved exhaust gas purifying system which can effectively oxidize HC and CO emitted from an internal combustion engine even immediately after engine starting.

An exhaust gas purifying system according to the present invention comprises an exhaust gas composition regulating device for producing a low HC concentration reducing agent in a lean exhaust gas atmosphere where air-fuel ratio is leaner than a stoichiometric value. The exhaust gas composition regulating device is disposed in an exhaust gas passageway of a combustion device The low HC concentration reducing agent is low in concentration of hydrocarbons to have an exhaust gas composition having a volume ratio of NOx/HC not less than 50 in the exhaust gas passageway immediately downstream of the exhaust gas composition regulating device. Additionally, a NOx treating catalyst is disposed in the exhaust gas passageway and located downstream of the exhaust gas composition regulating device. The NOx treating catalyst is arranged to reduce NOx in the presence of the low HC concentration reducing agent supplied from the exhaust gas composition regulating device. The exhaust gas composition of the low HC concentration reducing agent is obtained in the exhaust gas passageway immediately upstream of the NOx reducing catalyst.

DETAILED DESCRIPTION OF THE INVENTION

Figure 1:
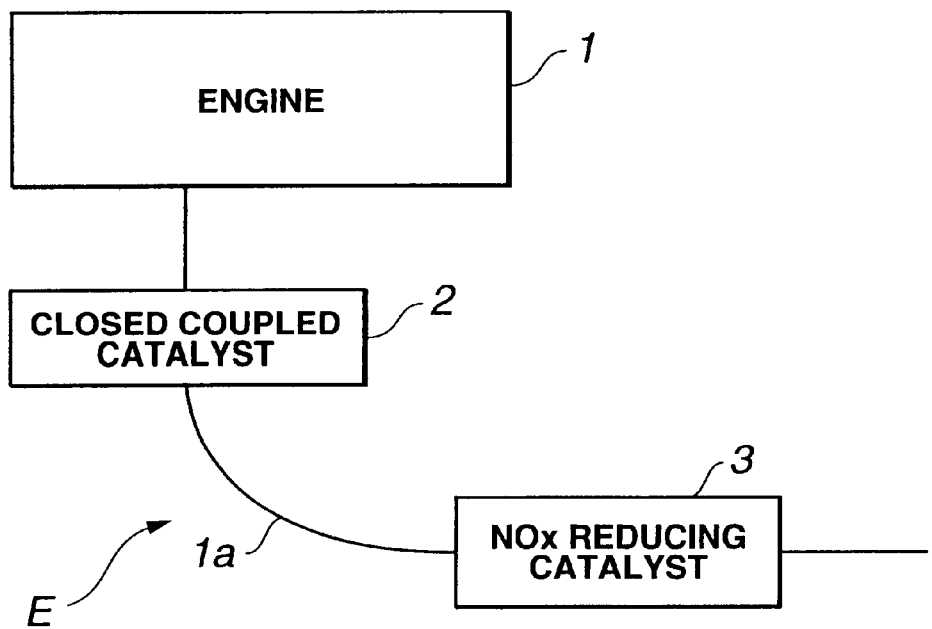
FIG. 1 is a schematic illustration of an example of an exhaust gas purifying system according to the present invention.

According to the present invention, an exhaust gas purifying system comprises an exhaust gas composition regulating device for producing a low HC (hydrocarbons) concentration reducing agent in a lean exhaust gas atmosphere where air-fuel ratio is leaner than a stoichiometric value. The exhaust gas composition regulating device is disposed in an exhaust gas passageway of a combustion device. The low HC concentration reducing agent is low in concentration of hydrocarbons to have an exhaust gas composition having a volume ratio of NOx (nitrogen oxides)/HC not less than 50 in the exhaust gas passageway downstream of the exhaust gas composition regulating device. Additionally, a NOx treating catalyst is disposed in the exhaust gas passageway and located downstream of the exhaust gas composition regulating device. The NOx treating catalyst is arranged to reduce NOx in the presence of the low HC concentration reducing agent supplied from the exhaust gas composition regulating device. The exhaust gas composition of the low HC concentration reducing agent is obtained in the exhaust gas passageway immediately upstream of the NOx reducing catalyst. It will be understood that the exhaust gas composition regulating device and the NOx treating catalyst are respectively located at former and latter stages.

The combustion device is a device in which fuel or combustibles are burnt or combusted to generate exhaust gas, for example, an internal combustion engine of an automotive vehicle. The exhaust gas composition regulating device is preferably located immediately downstream of the internal combustion engine. It is sufficient that the exhaust gas composition regulating device functions to produce and supply the low HC reducing gas (low in HC concentration) or agent under an oxygen-excessive atmosphere or the lean exhaust gas atmosphere. The oxygen-excessive atmosphere or lean exhaust gas atmosphere has an air-fuel ratio leaner (in fuel) than the stoichiometric level, in which an air/fuel ratio is larger than 14.7. An example of such an exhaust gas composition regulating device is a high performance closed coupled (three-way) catalyst for oxidizing HC and CO (carbon monoxide) in exhaust gas discharged from the combustion device such as the engine. The closed coupled catalyst is disposed closed and coupled to an exhaust manifold of the engine.

The high performance closed coupled (three-way) catalyst can cause HC in exhaust gas to react with oxygen thereby accomplishing oxidation treatment for HC, so that the concentration of HC in exhaust gas is lowered. More specifically, the closed coupled (three-way) catalyst can produce the low HC concentration reducing gas having an exhaust gas composition whose NOx/HC volume ratio is not less than 50, in the oxygen-excessive atmosphere. If the NOxIHC ratio is less than 50, trapping of NOx to the NOx purifying catalyst at the latter stage and reaction of NOx with $H_2$ and $NH_3$ is obstructed in a lean engine operating region thereby providing an insufficient NOx purifying performance. In the lean engine operating region, the engine is supplied with an air-fuel mixture having an air-fuel ratio leaner (in fuel) than the stoichiometric level, thereby producing the lean exhaust gas atmosphere.

It will be understood that the concentration of an exhaust gas component in actual exhaust gas is affected by the composition of exhaust gas discharged from the engine, and therefore the amount of HC to be oxidized by the closed coupled (three-way) catalyst is changed according to the exhaust gas composition. In the present invention, the closed coupled (three-way) catalyst causes HC to react with $O_2$ (oxygen) in the oxygen-excessive atmosphere thereby accomplishing oxidation reaction or treatment of HC in such a manner that the concentration of HC in an inlet section of or in the exhaust gas passageway immediately upstream of the NOx reducing catalyst becomes not higher than 50 ppm. If the HC concentration exceeds 50 ppm, reaction of NOx with $H_2$, $NH_3$ in the lean engine operating region is impeded so that a sufficient NOx reduction performance cannot be obtained, while HC is unavoidably emitted without being sufficiently oxidized in the latter stage NOx reducing catalyst so that a sufficient HC reduction performance cannot be obtained in the exhaust gas purifying system.

In such a low HC concentration condition, according to the conventional exhaust gas purifying system using a conventional NOx trap (storage-reduction) catalyst as disclosed in Japanese Patent No. 2600492, HC and CO as reducing agent for releasing and reducing NOx make their oxidation reaction in a closed coupled (three-way) catalyst, so that a required amount of the reducing agent cannot be supplied to the NOx trap catalyst in an exhaust passageway downstream of the closed coupled (three-way) catalyst. Accordingly, a sufficient NOx reduction performance cannot be obtained even though NOx is released from the NOx trap catalyst by lowering the concentration of oxygen in exhaust gas. The NOx trap catalyst is also disclosed in "International Symposium on Surface Nano-control of Environmental Catalysts and Related Materials ($6^{th}$ Iketani Conference), Tokyo, 1996, Page 74".

In contrast, according to the present invention, the reducing agent for treating NOx absorbed in the NOx treating catalyst in the oxygen-excess atmosphere is supplied from the high performance closed coupled (three-way) catalyst as the low HC concentration reducing agent or gas having the above-mentioned composition at the inlet section of the NOx reduction catalyst. At this time, HC and CO (particularly HC) in the low HC concentration reducing gas has been oxidized and removed by the high performance closed coupled (three-way) catalyst; however, $NH_3$ and $H_2$ are produced in the closed coupled (three-way) catalyst and serve as the reducing agent thereby ensuring an effective NOx reduction.

Hereinafter, production of the low HC concentration reducing agent or gas in the high performance closed coupled (three-way) catalyst will be discussed.

Such low HC concentration reducing agent or gas can be obtained by promoting reaction of gas such as HC and NOx in exhaust gas discharged from the engine under the action of the high performance closed coupled (three-way) catalyst. Reactions in the high performance closed coupled (three-way) catalyst are made as follows: First, HC in exhaust gas is reacted with oxygen on or in presence of palladium as a catalytically active component thereby to be formed into its partially oxidized state. Then, CO and $H_2O$ are reacted with each other on or in presence of palladium as the catalytically active component in the catalyst containing cerium oxide thereby to form $H_2$. Additionally, the partially oxidized state HC produced on the palladium is reacted with $H_2O$ on or in presence of rhodium thereby to from $H_2$. It will be appreciated that the cerium oxide serves to promote the above reactions.

Production of the low HC concentration reducing agent or gas in the high performance closed coupled (three-way) catalyst is supposed to be made with the following reactions in the exhaust gas purifying system of the present invention:

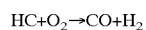

$HC+O_2 \rightarrow CO+H_2$

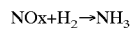

$NOx+H_2 \rightarrow NH_3$

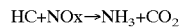

$HC+NOx \rightarrow NH_3+CO_2$

In the exhaust gas purifying system according to the present invention, the thus formed $NH_3$ and $H_2$ serve as components of the reducing agent so as to react with NOx in the NOx treating catalyst thereby reducing and removing NOx.

As discussed with reference to the above chemical reaction formulae, according to the present invention, the high performance closed coupled (three-way) catalyst regulates the composition of exhaust gas so as to produce the reducing components such as $NH_3$. In this regard, it is to be noted that the technique of the present invention is quite different from a conventional so-called NOx selective catalytic reduction method in which a reducing component such as $NH_3$ is independently introduced from the outside and mixed into exhaust gas to selectively reducing NOx with $NH_3$.

Besides, in the exhaust gas purifying system of the present invention, the following reactions are supposed to occur as reducing reactions:

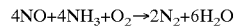

$4NO+4NH_3+O_2 \rightarrow 2N_2+6H_2O$

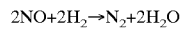

$2NO+2H_2 \rightarrow N_2+2H_2O$

In case that the catalyst used at the latter stage is a NOx selective reduction catalyst for selectively reducing NOx, NOx can selectively react with $H_2$, $NH_3$ even in a lean condition or the lean exhaust gas atmosphere, and therefore absorption of NOx and release of NOx for reduction are particularly unnecessary because NOx can selectively react with $H_2$ and $NH_3$. The NOx selective reduction catalyst is disclosed in "Science and Technology in Catalysis 1998, Page 363, Kodansha", and "TOCAT3 (1998), Page 49, Third Tokyo Conference on Advanced Catalytic Science and Technology 1998, Program and Abstracts".

In case that the catalyst used at the latter stage is the NOx trap catalyst, NOx is temporarily trapped in the catalyst during a steady state engine operation and is released to be reacted with the reducing agent so as to be reduce. In this case, in order to release NOx from the NOx trap catalyst, for example, the concentration of oxygen is maintained constant while changing the concentration ratio among other exhaust gas components such as HC, CO and NOx by changing the volume of exhaust gas discharged from the engine and by controlling the engine operating conditions.

Additionally, in the lean condition where the air-fuel ratio (composition) of exhaust gas is shifted lean and around the stoichiometric level, a three-way catalyst can be used as the NOx reducing catalyst. Also in this case, processes of trapping and releasing NOx are unnecessary, in which reduction reaction of NOx can be directly accomplished in exhaust gas.

In order to produce the reducing agent in the exhaust gas composition regulating device, controlling the air-fuel ratio of air-fuel mixture (i.e., enriching the air-fuel mixture) to be supplied to the engine is accomplished every a certain time regardless of engine operating and/or vehicle running conditions, or at a timing taking account of the engine operating and/or the vehicle running conditions. This timing for the air-fuel ratio controlling is in a condition where the amount of NOx trapped in the NOx treating catalyst is increased, or a condition (temperature, exhaust gas flow amount and the like) where NOx is liable to be reduced by the NOx treating catalyst.

Furthermore, the reducing agent produced by the high performance closed coupled (three-way) catalyst is temporarily stored in the NOx treating catalyst without being reacted with NOx when it is produced, and released from the catalyst so as to be reacted with NOx when a condition suitable for NOx reduction reaction is reached. In this case, the reducing agent produced and supplied to the NOx treating catalyst may be retained upon being adsorbed onto the surface of a porous carrier having a high specific surface area, for example, alumina and zeolite, and/or upon being adsorbed or absorbed to cesium, barium, sodium, potassium, magnesium, lanthanum and calcium which are components to be added to the NOx reduction catalyst. A time duration in which the reducing agent produced by the high performance closed coupled (three-way) catalyst is temporarily stored in the NOx reduction catalyst is, for example, from a time at which a steady state running of the vehicle shifts to an acceleration running to a time at which the temperature of exhaust gas rises over a certain temperature in case that the reducing agent is produced during the steady state running.

A typical arrangement of the exhaust gas purifying system of the present invention will be discussed with reference to FIG. 1.

An internal combustion engine 1 is provided with an exhaust system E including an exhaust gas passageway 1a through which exhaust gas from the engine 1 flows to be discharged. The engine 1 of this instance is for an automotive vehicle. A high performance closed coupled (three-way) catalyst 2 is disposed in the exhaust gas passageway 1a and located immediately downstream of an exhaust gas outlet or intake manifold (no numeral) of the engine 1. The closed coupled (three-way) catalyst 2 is disposed closed to and coupled with the intake manifold, and functions to oxidize HC and CO. A NOx treating catalyst 3 is disposed in the exhaust gas passageway 1a and located downstream of the high performance closed coupled (three-way) catalyst 2. The NOx treating catalyst 3 functions first to absorb (under oxidation) NOx contained in exhaust gas in the oxygen-excessive atmosphere and then to promote reduction of NOx when the reducing agent is supplied thereto. Thus, the high performance closed coupled (three-way) catalyst 2 and the NOx treating catalyst 3 constitute the exhaust gas purifying system.

Each of the high performance closed coupled (three-way) catalyst 2 and the NOx treating catalyst 3 preferably forms part of a block-like catalytic element (not shown) including a monolithic carrier (not shown). The monolithic carrier is preferably a honeycomb monolithic carrier formed of a heat resistant material.

Examples of the heat resistant material are ceramic such as cordierite ceramic, and metal such as ferrite stainless steel. Each of the high performance closed coupled (three-way) catalyst 2 and the NOx treating catalyst 3 is preferably carried on the monolithic carrier.

Additionally, each of the high performance closed coupled (three-way) catalyst 2 and the NOx treating catalyst 3 is preferably carried on porous carrier (in powder state). Examples of the porous carrier are alumina, compound oxide of silica and alumina, and zeolite, and any combination of the alumina, the compound oxide and zeolite, in which activated alumina is preferable. It is preferable that the porous carrier contains rare earth element(s) and/or zirconium in order to improve heat resistance and specific surface area of the porous carrier. The porous carrier with the catalyst 2, 3 is supported on the monolithic carrier so as to form a coat layer which forms part of the block-like catalytic element. It is preferable that the amount of the porous carrier to be used is within a range of from 50 to 300 g per 1 liter of the monolithic carrier. If the amount is less than 50 g per 1 liter, a time for which exhaust gas is staying in the coat layer is unavoidably short thereby providing an insufficient exhaust gas purifying performance. If the amount exceeds 300 g per 1 liter, the thickness of the coat layer is increased thereby to degrade diffusivity of exhaust gas, thereby providing an insufficient exhaust gas purifying performance.

The high performance closed coupled (three-way) catalyst includes first and second component. The first component is noble metal element(s) such as platinum, palladium, rhodium, and/or any combination or mixture of these noble metal elements. The second component is rare earth element (s) such as lanthanum, cerium, praseodymium, neodymium and samarium, and/or any combination or mixture of these elements. The high performance closed coupled (three-way) catalyst may include zirconium, if necessary. The high performance closed coupled (three-way) catalyst is normally used to be coated on the honeycomb monolithic carrier. The amount of the high performance closed coupled (three-way) catalyst to be used is not limited to a particular range but is preferably within a range of from 10 to 30 g per 1 liter of the monolithic carrier. If the amount is less than 10 g per 1 liter, a sufficient oxidation performance cannot be obtained under a low exhaust gas temperature condition. If the amount exceeds 30 g per 1 liter, a sufficient performance improvement corresponding to an increased amount of the catalyst cannot be obtained.

It is preferable that at least a part of the high performance closed coupled (three-way) catalyst is carried on the above-mentioned porous carrier, in which the porous carrier is preferably formed of alumina. It is preferable that the alumina has a high heat resistance and is activated alumina having a specific surface area ranging from 50 to 300 m$^2$/g. In order to improve the heat resistance of the alumina, the alumina may contain rare earth element(s) such as cerium and/or lanthanum, and/or zirconium.

The NOx treating catalyst 3 contains first component and second components. The first component is noble metal element(s) platinum, palladium, and/or any combination or mixture of these elements. The second component is metal element(s) such as cesium, barium, sodium, potassium, magnesium, lanthanum and calcium, and/or any combination or mixture of these elements. The NOx treating catalyst 3 is normally used to be carried on the honeycomb monolithic carrier. The amount of the NOx treating catalyst 3 to be used is not limited to a particular range as far as sufficient NOx absorbing and reducing functions can be attained. However, this amount is preferably within a range of from 0.1 to 10 g per 1 liter of the monolithic carrier like in usual three-way catalytic converters.

Additionally, the NOx treating catalyst preferably functions as a three-way catalyst when the engine is supplied with stoichiometric air-fuel mixture, and therefore it is preferable that the at least a part of at least one element of the first component is carried on the porous carrier. The porous carrier is preferably formed of alumina which has a high heat resistance and is activated alumina having a specific surface area ranging from 50 to 300 m$^2$/g. In order to improve the heat resistance of the alumina, the alumina may contain additives such as compound(s) of rate earth element(s) such as cerium and/or lanthanum, and/or zirconium. Furthermore, for the purpose of enhancing the function of the three-way catalyst, the NOx treating catalyst may contain materials which have conventionally used in three-way catalysts, for example, ceria having a so-called oxygen storage function, and/or barium having a function of preventing disadvantage due to quick absorption of HC, and/or zirconia contributing to improving catalytic performance of Rh at high temperatures.

More specifically, the NOx trap catalyst and/or the three-way catalyst are used as the NOx treating catalyst. The NOx selective reduction catalyst is arranged to reduce NOx in the lean exhaust gas atmosphere upon being supplied with the reducing agent from the exhaust gas composition regulating device. The NOx selective reduction catalyst includes zeolite and/or alumina as the porous carrier, in which the porous carrier contains or carries at least one of platinum, rhodium and palladium, and at least one of copper, cobalt, nickel, iron, gallium, lanthanum, cerium, zinc, titanium, calcium, barium and silver.

The NOx trap catalyst is arranged to temporarily trap NOx in the lean exhaust gas atmosphere and release and reduce NOx upon being supplied with the reducing agent from the exhaust composition regulating device. The NOx trap catalyst includes at least one of platinum, palladium and rhodium, and at least one of cesium, barium, sodium, potassium, magnesium, lanthanum and calcium.

The three-way catalyst is arranged to reduce NOx in the lean exhaust gas atmosphere where air-fuel ratio is near the stoichiometric level. The three-way catalyst includes at least one of platinum, palladium and rhodium, and at least one of lanthanum, cerium, praseodymium, neodymium and samarium. The three-way catalyst may include at least one of zirconium and barium.

EXAMPLES

The present invention will be more readily understood with reference to the following Examples in comparison with Comparative Examples; however, these Examples are intended to illustrate the invention and are not to be construed to limit the scope of the invention.

Example 1

Preparation of Catalytic Element of High Performance Closed Coupled (three-way) Catalyst Activated alumina powder was impregnated with an aqueous solution of palladium (Pd) nitrate. The impregnated activated alumina was dried and then fired in air at 400° C. for 1 hour thereby to form activated alumina powder carrying Pd (Powder 1). This powder had a Pd concentration of 17.0% by weight.

Further, activated alumina powder containing cerium and zirconium was impregnated with an aqueous solution of rhodium (Rh) nitrate. The impregnated activated alumina was dried and then fired in air at 400° C. for 1 hour thereby to form activated alumina powder carrying Rh (Powder 2). This powder had a Rh concentration of 3.0% by weight.

Furthermore, activated alumina powder was impregnated with a solution of platinum (Pt) nitrate. The impregnated activated alumina powder was dried and then fired in air at 400° C. for 1 hour thereby to form activated alumina powder carrying Pt (Powder 3). This powder had a Pt concentration of 1.0% by weight.

A porcelain ball mill was charged with 377.6 g of Powder 1, 107.6 g of Powder 2, 64.9 g of Powder 3, 49 g of cerium oxide, 200.9 g of activated alumina powder, and 1000 g of alumina sol. The content of the ball mill was mixed and pulverized for 1 hour thereby to form a slurry. This slurry was coated on a cordierite ceramic honeycomb-type monolithic carrier having a volume of 1.3 liters and 400 cells per square inch. The cells were formed extending throughout the length of the monolithic carrier. Then, the coated monolithic carrier was blown with air to remove excessive slurry in the cells under the action of air stream. Thereafter, the coated monolithic carrier was dried at 130° C. and then fired at 400° C. for 1 hour thereby to form a monolithic carrier provided with a coat layer having a weight of 140 g per 1 liter of the monolithic carrier.

Thereafter, the thus coated monolithic carrier was impregnated with an aqueous solution of barium acetate. The thus impregnated monolithic carrier was dried at 120° C. and then fired at 400° C. so as to carry barium. As a result, a catalytic element of a high performance closed coupled (three-way) catalyst was prepared. The catalytic element had a weight ratio (in metallic state) of platinum/palladium/rhodium=1/100/5, in which the amount of total noble metals was 14 g per 1 liter of the monolithic carrier.

Preparation of Catalytic Element of NOx Treating Catalyst

Activated alumina powder was impregnated with an aqueous solution of palladium (Pd) nitrate. The impregnated activated alumina was dried and then fired in air at 400° C. for 1 hour thereby to form activated alumina powder carrying Pd (Powder B). This powder had a Pd concentration of 5.0% by weight.

Further, activated alumina powder was impregnated with an aqueous solution of rhodium (Rh) nitrate. The impregnated activated alumina was dried and then fired in air at 400° C. for 1 hour thereby to form activated alumina powder carrying Rh (Powder C). This powder had a Rh concentration of 3.0% by weight.

A porcelain ball mill was charged with 347 g of Powder B, 58 g of Powder C, 496 g of activated alumina powder, and 900 g of water. The content of the ball mill was mixed and pulverized for 1 hour thereby to form a slurry. This slurry was coated on a cordierite ceramic honeycomb-type monolithic carrier having a volume of 1.3 liters and 400 cells per square inch. Then, the coated monolithic carrier was blown with air to remove excessive slurry in the cells under the action of air stream. Thereafter, the coated monolithic carrier was dried at 130° C. and then fired at 400° C. for 1 hour thereby to form a monolithic carrier provided with a coat layer having a weight of 200 g per 1 liter of the monolithic carrier.

Thereafter, the thus coated monolithic carrier was impregnated with an aqueous solution of barium acetate. The thus impregnated monolithic carrier was dried at 120° C. and then fired at 400° C. so as to carry barium. As a result, a catalytic element of a NOx treating catalyst was prepared to have a weight ratio (in metallic state) of palladium/rhodium=14/1, in which the amount of total noble metals was 4.24 g per 1 liter of the monolithic carrier.

Construction of Exhaust Gas Purifying System

The catalytic element of the closed coupled (three-way) catalyst and the catalytic element of the NOx treating catalyst were disposed in the exhaust gas passageway of the exhaust system, in which the catalytic element of the closed coupled (three-way) catalyst was located upstream of the catalytic element of the NOx treating catalyst. Thus, the exhaust gas purifying system of Example 1 was constructed.

Example 2

A catalytic element of a high performance closed coupled (three-way) catalyst was prepared in the same manner as that in Example 1.

A catalytic element of a NOx treating catalyst was prepared in a similar manner to that in Example 1 with the exception that cesium carbonate was used in place of barium acetate.

The thus prepared catalytic elements were arranged the same as those in Example 1, thereby constructing the exhaust gas purifying system of Example 2.

Example 3

A catalytic element of a high performance closed coupled (three-way) catalyst was prepared in the same manner as that in Example 1.

A catalytic element of a NOx treating catalyst was prepared in a similar manner to that in Example 1 with the exception that sodium carbonate was used in place of barium acetate.

The thus prepared catalytic elements were arranged the same as those in Example 1, thereby constructing the exhaust gas purifying system of Example 3.

Example 4

A catalytic element of a high performance closed coupled (three-way) catalyst was prepared in the same manner as that in Example 1.

A catalytic element of a NOx treating catalyst was prepared in a similar manner to that in Example 1 with the exception that potassium carbonate was used in place of barium acetate.

The thus prepared catalytic elements were arranged the same as those in Example 1, thereby constructing the exhaust gas purifying system of Example 4

Example 5

A catalytic element of a high performance closed coupled (three-way) catalyst was prepared in the same manner as that in Example 1.

A catalytic element of a NOx treating catalyst was prepared in a similar manner to that in Example 1 with the exception that magnesium carbonate was used in place of barium acetate.

The thus prepared catalytic elements were arranged the same as those in Example 1, thereby constructing the exhaust gas purifying system of Example 2.

Example 6

A catalytic element of a high performance closed coupled (three-way) catalyst was prepared in the same manner as that in Example 1.

A catalytic element of a NOx treating catalyst was prepared in a similar manner to that in Example 1 with the exception that lanthanum carbonate was used in place of barium acetate.

The thus prepared catalytic elements were arranged the same as those in Example 1, thereby constructing the exhaust gas purifying system of Example 2.

Example 7

A catalytic element of a high performance closed coupled (three-way) catalyst was prepared in the same manner as that in Example 1.

A catalytic element of a NOx treating catalyst was prepared in a similar manner to that in Example 1 with the exception that calcium carbonate was used in place of barium acetate.

The thus prepared catalytic elements were arranged the same as those in Example 1, thereby constructing the exhaust gas purifying system of Example 2.

Example 8

A catalytic element of a high performance closed coupled (three-way) catalyst was prepared in the same manner as that in Example 1.

Citric acid was added to a mixture of lanthanum carbonate, barium carbonate and cobalt carbonate. The mixture with citric acid was dried and then fired at 700° C. thereby forming a powder (Powder D). This powder had a weight ratio (in metallic state) lanthanum/barium/cobalt=2/7/10.

A porcelain ball mill was charged with 347 g of Powder B and 58 g of Powder C prepared the same as those in Example 1,360 g of Powder D, 136 g of activated alumina and 900 g of water. The content of the ball mill was mixed and pulverized for 1 hour thereby to form a slurry. This slurry was coated on a cordierite ceramic honeycomb-type monolithic carrier having a volume of 1.3 liters and 400 cells per square inch. Then, the coated monolithic carrier was blown with air to remove excessive slurry in the cells under the action of air stream. Thereafter, the coated monolithic carrier was dried at 130° C. and then fired at 400° C. for 1 hour thereby to form a monolithic carrier provided with a coat layer having a weight of 200 g per 1 liter of the monolithic carrier. As a result, a catalytic element of a NOx treating catalyst was prepared.

The thus prepared catalytic elements were arranged the same as those in Example 1, thereby constructing the exhaust gas purifying system of Example 8.

Example 9

A porcelain ball mill was charged with 509.6 g of Powder 1, 115.2 g of Powder 2, 86.8 g of Powder 3 (these Powders were used in Example 1), 49 g of cerium oxide powder, 39.4 g of activated alumina powder, and 100 g of alumina sol. The content of the ball mill was mixed and pulverized for 1 hour thereby to form a slurry. This slurry was coated on a cordierite ceramic honeycomb-type monolithic carrier having a volume of 1.3 liters and 400 cells per square inch. Then, the coated monolithic carrier was blown with air to remove excessive slurry in the cells under the action of air stream. Thereafter, the coated monolithic carrier was dried at 130° C. and then fired at 400° C. for 1 hour thereby to form a monolithic carrier provided with a coat layer having a weight of 140 g per 1 liter of the monolithic carrier.

Thereafter, the thus coated monolithic carrier was impregnated with an aqueous solution of barium acetate. The thus impregnated monolithic carrier was dried at 120° C. and then fired at 400° C. so as to carry barium. As a result, a catalytic element of a NOx treating catalyst was prepared. This coated monolithic carrier had a weight ratio (in metallic state) platinum/palladium/rhodium=1/100/4, in which the amount of total noble metals was 18.5 g per 1 liter of the monolithic carrier.

A catalytic element of a NOx treating catalyst was prepared the same as that in Example 1.

The thus prepared catalytic elements were arranged the same as those in Example 1, thereby constructing the exhaust gas purifying system of Example 9.

Example 10

Preparation of Catalytic Element of High Performance Closed Coupled (three-way) Catalyst (for Former Stage)

Activated alumina powder was impregnated with an aqueous solution of palladium (Pd) nitrate. The impregnated activated alumina was dried and then fired in air at 400° C. for 1 hour thereby to form activated alumina powder carrying Pd (Powder 4). This powder had a Pd concentration of 7.5% by weight.

A porcelain ball mill was charged with 963 g of Powder 4, 37 g of activated alumina powder, and 1000 g of water. The content of the ball mill was mixed and pulverized for 1 hour thereby to form a slurry. This slurry was coated on a cordierite ceramic honeycomb-type monolithic carrier having a volume of 0.6 liter and 400 cells per square inch. Then, the coated monolithic carrier was blown with air to remove excessive slurry in the cells under the action of air stream. Thereafter, the coated monolithic carrier was dried at 130° C. and then fired at 400° C. for 1 hour thereby to form a monolithic carrier provided with an inner coat layer having a weight of 80 g per 1 liter of the monolithic carrier, in which the amount of palladium was 5.8 g per 1 liter of the monolithic carrier.

This monolithic carrier was coated with a slurry which had been prepared as follows: A porcelain ball mill was charged with 986 g of Powder 1 prepared in Example 1, 14 g of activated alumina powder, and 1000 g of water. The content of the ball mill was mixed and pulverized for 1 hour thereby to form the slurry. Then, the coated monolithic carrier was blown with air to remove excessive slurry in the cells under the action of air stream. Thereafter, the coated monolithic carrier was dried at 130° C. and then fired at 400° C. for 1 hour thereby to form a monolithic carrier provided with an outer coat layer having a weight of 71 g per 1 liter of the monolithic carrier, in which the amount of palladium was 11.9 g per 1 litter of the monolithic carrier. Further, this coated monolithic carrier was impregnated with an aqueous solution of barium acetate, and then dried at 120° C. and fired at 400° C. so as to carry barium. Thus, a catalytic element of a closed coupled (three-way) catalyst to be used at the former stage was prepared.

Preparation of Catalytic Element of High Performance Closed coupled (three-way) Catalyst (for Latter Stage)

The monolithic carrier provided with the coat layer having the weight of 80 g per 1 liter of the monolithic carrier (prepared in the preparation of the catalytic element of the high performance closed coupled (three-way) catalyst at the former stage) was coated with a slurry which had been prepared as follows: A porcelain ball mill was charged with 443 g of Powder 2, 334 g of Powder 3 (the Powders were prepared in Example 1), 189 g of cerium oxide to which zirconium was added, 34 g of activated alumina powder, and 1000 g of water. The content of the ball mill was mixed and pulverized for 1 hour thereby to form the slurry. After coated, the coated monolithic carrier was blown with air to remove excessive slurry in the cells under the action of air stream. Thereafter, the coated monolithic carrier was dried at 130° C. and then fired at 400 ° C. for 1 hour thereby to form a monolithic carrier provided with a coat layer having a weight of 35 g per 1 liter of the monolithic carrier. Further, this coated monolithic carrier was impregnated with an aqueous solution of barium acetate, and then dried at 120° C. and fired at 400° C. so as to carry barium. Thus, a catalytic element of a closed coupled (three-way) catalyst to be used at the latter stage was prepared. The catalytic element has a weight ratio (in metallic state) of platinum/rhodium=1/4, in which the amount of the total noble metals was 0.88 g per 1 liter of the monolithic carrier.

Construction of Exhaust Gas Purifying System

The catalytic elements of the closed coupled (three-way) catalyst for the former stage and the closed coupled (three-way) catalyst for the latter stage were disposed in a casing of a catalytic converter and located at the former and latter stages, respectively. This serves as a closed coupled (three-way) catalyst unit of Example 10.

A catalytic element of a NOx treating catalyst was prepared the same as that in Example 2.

The closed coupled (three-way) catalyst unit and the catalytic element of the NOx treating catalyst were disposed in the exhaust gas passageway of the exhaust system, in which the closed coupled (three-way) catalyst unit was located upstream of the catalytic element of the NOx treating catalyst. Thus, the exhaust gas purifying system of Example 10 was constructed.

Example 11

A closed coupled (three-way) catalyst unit was produced the same as that in Example 10, and therefore includes the former and latter stage catalytic elements of the closed coupled (three-way) catalysts.

Two of the NOx treating catalysts prepared the same as that in Example 2 were provided. These were disposed respectively in the casings of two catalytic converters which were located in series, thus producing a NOx treating catalyst unit of Example 11.

The closed coupled (three-way) catalyst unit and the NOx treating catalyst unit were disposed in the exhaust gas passageway of the exhaust system, in which the closed coupled (three-way) catalyst unit was located upstream of the catalytic element of the NOx treating catalyst unit. Thus, the exhaust gas purifying system of Example 11 was constructed.

Example 12

A porcelain ball mill was charged with 304.8 g of Powder 1, 86.8 g of Powder 2, 52.4 g of Powder 3 (the Powders were prepared in Example 1), 49 g of cerium oxide, 307.0 g of activated alumina powder, and 1000 g of alumina sol. The content of the ball mill was mixed and pulverized for 1 hour thereby to form a slurry. This slurry was coated on a cordierite ceramic honeycomb-type monolithic carrier having a volume of 1.3 liters and 400 cells per square inch. Then, the coated monolithic carrier was blown with air to remove excessive slurry in the cells under the action of air stream. Thereafter, the coated monolithic carrier was dried at 130° C. and then fired at 400° C. for 1 hour thereby to form a monolithic carrier provided with a coat layer having a weight of 140 g per 1 liter of the monolithic carrier.

Thereafter, the thus coated monolithic carrier was impregnated with an aqueous solution of barium acetate. The thus impregnated monolithic carrier was dried at 120° C. and then fired at 400° C. so as to carry barium. As a result, a catalytic element of a high performance closed coupled (three-way) catalyst was prepared. The catalytic element had a weight ratio (in metallic state) of platinum/palladium/rhodium=1/100/5, in which the amount of total noble metals was 11.30 g per 1 liter of the monolithic carrier.

A catalytic element of a NOx treating catalyst was prepared the same as that in Example 3.

The catalytic element of the closed coupled (three-way) catalyst and the catalytic element of the NOx treating catalyst were disposed in the exhaust gas passageway of the exhaust system, in which the catalytic element of the closed coupled (three-way) catalyst was located upstream of the catalytic element of the NOx treating catalyst. Thus, the exhaust gas purifying system of Example 12 was constructed.

Example 13

A porcelain ball mill was charged with 364.5 g of Powder 1, 103.9 g of Powder 2, 62.7 g of Powder 3 (the Powders were prepared in Example 1), 45 g of cerium oxide powder, 223.9 g of activated alumina powder, and 1000 g of alumina sol. The content of the ball mill was mixed and pulverized for 1 hour thereby to form a slurry. This slurry was coated on a cordierite ceramic honeycomb-type monolithic carrier having a volume of 1.3 liters and 400 cells per square inch. Then, the coated monolithic carrier was blown with air to remove excessive slurry in the cells under the action of air stream. Thereafter, the coated monolithic carrier was dried at 130° C. and then fired at 400° C. for 1 hour thereby to form a monolithic carrier provided with a coat layer having a weight of 140 g per 1 liter of the monolithic carrier.

Thereafter, the thus coated monolithic carrier was impregnated with an aqueous solution of barium acetate. The thus impregnated monolithic carrier was dried at 120° C. and then fired at 400° C. so as to carry barium. As a result, a catalytic element of a high performance closed coupled (three-way) catalyst was prepared. The catalytic element had a weight ratio (in metallic state) of platinum/palladium/rhodium=1/100/5, in which the amount of total noble metals was 14 g per 1 liter of the monolithic carrier.

A catalytic element of a NOx treating catalyst was prepared the same as that in Example 2.

The thus prepared catalytic elements were arranged the same as those in Example 1, thereby constructing the exhaust gas purifying system of Example 13.

Comparative Example

Preparation of Catalytic Element of Closed Coupled (three-way) Catalyst

Activated alumina powder was impregnated with an aqueous solution of palladium (Pd) nitrate. The impregnated activated alumina was dried and then fired in air at 400° C. for 1 hour thereby to form activated alumina powder carrying Pd (Powder 1). This powder had a Pd concentration of 17.0% by weight.

Further, activated alumina powder to which cerium and zirconium had been added was impregnated with an aqueous solution of rhodium (Rh) nitrate. The impregnated activated alumina was dried and then fired in air at 400° C. for 1 hour thereby to form activated alumina powder carrying Rh (Powder 2). This powder had a Rh concentration of 3.0% by weight.

Furthermore, activated alumina powder was impregnated with a solution of platinum (Pt) nitrate. The impregnated activated alumina powder was dried and then fired in air at 400° C. for 1 hour thereby to form activated alumina powder carrying Pt (Powder 3). This powder had a Pt concentration of 1.0% by weight.

A porcelain ball mill was charged with 190.7 g of Powder 1, 54.0 g of Powder 2 (the Powders were used in Example 1), 49 g of cerium oxide, 506.3 g of activated alumina powder, and 1000 g of alumina sol. The content of the ball mill was mixed and pulverized for 1 hour thereby to form a slurry. This slurry was coated on a cordierite ceramic honeycomb-type monolithic carrier having a volume of 1.3 liters and 400 cells per square inch. Then, the coated monolithic carrier was blown with air to remove excessive slurry in the cells under the action of air stream. Thereafter, the coated monolithic carrier was dried at 130° C. and then fired at 400° C. for 1 hour thereby to form a monolithic carrier provided with a coat layer having a weight of 140 g per 1 liter of the monolithic carrier.

Thereafter, the thus coated monolithic carrier was impregnated with an aqueous solution of barium acetate. The thus impregnated monolithic carrier was dried at 120° C. and then fired at 400° C. so as to carry barium. As a result, a catalytic element of a closed coupled (three-way) catalyst was prepared. The catalytic element had a weight ratio (in metallic state) of palladium/rhodium=20/1, in which the amount of total noble metals was 7 g per 1 liter of the monolithic carrier.

A catalytic element of a NOx treating catalyst was prepared the same as that in Example 1.

The catalytic element of the closed coupled (three-way) catalyst and the catalytic element of the NOx treating catalyst were disposed in the exhaust gas passageway of the exhaust system, in which the catalytic element of the usual closed coupled (three-way) catalyst was located upstream of the catalytic element of the NOx treating catalyst. Thus, the exhaust gas purifying system of Comparative Example was constructed.

The features of the closed coupled (three-way) catalysts and the NOx treating catalysts of Examples and Comparative Example are summarized in Table 1.

Evaluation of Performance of Exhaust Gas Purifying System

Each of the exhaust gas purifying systems of Examples and Comparative Example was installed to the exhaust system of a cylinder-direct injection engine having a displacement of 1.8 liters and arranged such that gasoline was injected directly into the cylinder or combustion chamber of the engine. The engine was for a passenger car. In the exhaust system, the high performance closed coupled (three-way) catalyst or the closed coupled catalyst in the form of the catalytic element and the NOx treating catalyst in the form of the catalytic element were disposed in the exhaust passageway, in which the closed coupled catalyst was located upstream of the NOx treating catalyst as shown in FIG. 1. The catalytic element of the closed coupled catalyst was disposed immediately downstream of an intake manifold of the engine.

The automotive vehicle provided with the cylinder-direct injection engine was run under a test mode "FTP-75"employed in the United States of America. During the vehicle running under the test mode, the concentration of gas components (HC, CO and NO) at an upstream part of the exhaust gas passage and the concentration of the gas components at downstream part of the exhaust gas passageway were measured thereby obtaining a "remaining rate (%)"of the gas components (HC, CO and NO) shown in Table 2. The upstream part was located between the engine and the closed coupled (three-way) catalyst. The downstream part was located downstream of the NOx treating catalyst. The remaining rate (%) was calculated by [(1−the concentration of the gas component at the downstream part/the concentration of the gas component at the upstream part)×100], in which the concentration was measured as "ppm".

A volume ratio of "NOx/HC"in Table 2 was calculated upon measuring the (average) concentrations (ppm) of NOx and HC at the upstream part of the exhaust gas passageway during the vehicle running under the test mode "FTP-75". A "HC concentration (ppm)" corresponded to the above average concentration of HC. The measurement of the (average) concentrations of NOx and HC was made during vehicle running parts of the test mode "FTP-75"except for a vehicle running part immediately after (about 200 seconds after) the starting of the test mode "FTP-75". The vehicle running part immediately after the starting was excepted for the reason why the concentration of HC was high immediately after the starting.

Experiment results shown in Table 2 depicts that, by supplying the low HC concentration reducing agent or gas prepared by the high performance closed coupled (three-way) catalyst to the NOx treating catalyst in a lean exhaust gas atmosphere, the concentration of not only NOx but also HC and CO can be effectively lowered.

While the principle of the present invention has been discussed with reference to some examples, it will be appreciated that the scope of the present invention is not limited to the examples and therefore a variety of changes and variations may be made without departing from the sprit or scope disclosed in the specification and the claims. For example, it is sufficient that the high performance closed coupled catalyst and the NOx reducing catalyst can accomplish the above-discussed functions and therefore are not limited to them recited in the examples. Additionally, it is sufficient that one high performance closed coupled catalyst and one NOx reducing catalyst are disposed in the exhaust system, so that a plurality of the closed coupled catalyst and of the NOx reducing catalyst may be disposed in the exhaust system. Further, a conventional three-way catalyst and/or a HC trap catalyst may be incorporated in the exhaust system provided with the exhaust gas purifying system of the present invention.

As appreciated from the above, according to the exhaust gas purifying system of the present invention, the exhaust gas composition regulating device or means is disposed upstream of the NOx treating catalyst so that the reducing agent originated from exhaust gas is supplied from the exhaust gas composition regulating device to the NOx treating catalyst in the oxygen-excess condition thereby to appropriately control the composition of exhaust gas at a position immediately upstream of the NOx treating catalyst. This can effectively solve such a problem that the effect of fuel economy improvement has not been able to be obtained for the reasons why the concentration of oxygen in exhaust gas has been periodically lowered when the absorbed NOx is released and reduced. Accordingly, according to the exhaust gas purifying system of the present invention, the effect of fuel economy improvement can be obtained by operating the engine in the oxygen-excess condition. Additionally, not only NOx but also HC and CO can be effectively removed from exhaust gas. Particularly, HC and CO emitted from the engine immediately after engine starting (low in engine temperature) can be effectively removed from exhaust gas. In other words, according to the exhaust gas purifying system of the present invention, NOx can be effectively reduced even in the oxygen-excess atmosphere under the action of the reducing agent (preferably variation of the concentration of the reducing agent), thereby attaining both a high fuel economy and a high removal performance of HC, CO and NOx.

The entire contents of Japanese Patent Applications P11-188786 (filed Jul. 2, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

TABLE 1

| | Closed coupled catalyst | NOx treating catalyst |
|---|---|---|
| Example 1 | Pt/Pd/Rh = 1/100/5 14.0 g/l. | Pd/Rh = 14/1 4.24 g/l. Barium added |
| Example 2 | ↑ | Pd/Rh = 14/1 4.24 g/l. Cesium added |
| Example 3 | ↑ | Pd/Rh = 14/1 4.24 g/l. Sodium added |
| Example 4 | ↑ | Pd/Rh = 14/1 4.24 g/l. Potassium added |
| Example 5 | ↑ | Pd/Rh = 14/1 4.24 g/l. Magnesium added |
| Example 6 | ↑ | Pd/Rh = 14/1 4.24 g/l. Lanthanum added |
| Example 7 | ↑ | Pd/Rh = 14/1 4.24 g/l. Calcium added |
| Example 8 | ↑ | Pd/Rh = 14/1 4.24 g/l. La/Ba/Co = 2/7/10 added |
| Example 9 | Pt/Pd/Rh = 1/100/5 18.5 g/l. | Pd/Rh = 14/1 4.24 g/l. Barium added |
| Example 10 | Former stage: Inner layer-Pd 5.8 g/l.; Outer layer-Pd 11.9 g/l. Latter Stage: Pt/Rh = 1/4 0.88 g/l. | Pd/Rh = 14/1 4.24 g/l. Cesium added |
| Example 11 | Former stage: Inner layer-Pd 5.8 g/l.; Outer layer-Pd 11.9 g/l. Latter stage: Pt/Rh = 1/4 0.88 g/l. | Pd/Rh = 14/1 4.24 g/l. Cesium added Two catalysts disposed |
| Example 12 | Pr/Pd/Rh = 1/100/5 11.3 g/l. | Pd/Rh = 14/1 4.24 g/l. Cesium added |
| Example 13 | Pt/Pd/Rh = 1/100/5 14.0 g/l. | Pd/Rh = 14/1 4.24 g/l. Cesium added |
| Comparative example | Pd/Rh = 20/1 7 g/l. | Pd/Rh = 14/1 4.24 g/l. Barium added |

TABLE 2

| | Remaining rate (%) | | | NOx/HC | HC concentration (ppm) |
|---|---|---|---|---|---|
| | HC | CO | NO | | |
| Example 1 | 1.3% | 2.0% | 2.5% | 85 | 16 |
| Example 2 | 1.8% | 2.4% | 2.3% | ↑ | ↑ |
| Example 3 | 1.5% | 2.2% | 2.7% | ↑ | ↑ |
| Example 4 | 1.6% | 2.2% | 3.1% | ↑ | ↑ |
| Example 5 | 1.4% | 2.2% | 2.8% | ↑ | ↑ |
| Example 6 | 1.5% | 2.4% | 3.4% | ↑ | ↑ |
| Example 7 | 1.9% | 2.3% | 3.3% | ↑ | ↑ |
| Example 8 | 1.5% | 2.4% | 2.5% | ↑ | ↑ |
| Example 9 | 1.2% | 2.0% | 2.3% | 120 | 11 |
| Example 10 | 1.1% | 1.8% | 2.1% | 180 | 7 |
| Example 11 | 1.1% | 1.9% | 1.2% | ↑ | ↑ |
| Example 12 | 2.1% | 2.8% | 3.3% | 52 | 43 |
| Example 13 | 1.6% | 2.3% | 2.8% | 80 | 18 |
| Comparative example | 4.0% | 7.0% | 7.2% | 23 | 58 |

What is claimed is:

1. An exhaust gas purifying system comprising:
   an exhaust gas composition regulating device for producing a low HC concentration reducing agent in a lean exhaust gas atmosphere where air-fuel ratio is leaner than a stoichiometric value, said exhaust gas composition regulating device being disposed in an exhaust gas passageway of a combustion device, said low HC concentration reducing agent being low in concentration of hydrocarbons to have an exhaust gas composition having a volume ratio of NOx/HC not less than 50 in the exhaust gas passageway downstream of said exhaust gas composition regulating device; and
   a NOx treating catalyst for reducing NOx in the presence of the low HC concentration reducing agent supplied from said exhaust gas composition regulating device, said NOx treating catalyst being disposed in the exhaust gas passageway and located downstream of said exhaust gas composition regulating device, the exhaust gas composition of said low HC concentration reducing agent being obtained in the exhaust gas passageway immediately upstream of said NOx reducing catalyst.

2. An exhaust gas purifying system as claimed in claim 1, wherein the low HC concentration reducing agent has an exhaust gas composition having a volume ratio of NOx/HC not less than 80 in the exhaust gas passageway immediately upstream of said NOx reducing catalyst.

3. An exhaust gas purifying system as claimed in claim 1, wherein the low HC concentration reducing agent contains not larger than 50 ppm of HC in the exhaust passageway immediately upstream of said NOx treating catalyst.

4. An exhaust gas purifying system as claimed in claim 1, wherein said exhaust gas composition regulating device is a catalyst is arranged to oxidize HC and carbon CO in a stoichiometric and lean exhaust gas atmosphere where air-fuel ratio is within a range of from a first value around stoichiometric value to a second value leaner than the stoichiometric value.

5. An exhaust gas purifying system as claimed in claim 1, wherein said exhaust gas composition regulating device is a catalyst including at least one element selected from the group consisting of platinum, palladium, rhodium, and at lease one element selected from the group consisting of lanthanum, cerium, praseodymium, neodymium and samarium.

6. An exhaust gas purifying system as claimed in claim 5, wherein said catalyst of said exhaust gas composition regulating device includes zirconium.

7. An exhaust gas purifying system as claimed in claim 1, wherein said NOx treating catalyst is arranged to reduce NOx in the lean exhaust gas atmosphere upon being supplied with the reducing agent from said exhaust gas composition regulating device.

8. An exhaust gas purifying system as claimed in claim 7, wherein said NOx treating catalyst includes at least one porous carrier selected from the group consisting of zeolite and alumina, at least one element carried on said porous carrier and selected from the group consisting of platinum, rhodium and palladium, and at least one element carried on said porous carrier and selected from the group consisting of copper, cobalt, nickel, iron, gallium, lanthanum, cerium, zinc, titanium, calcium, barium and silver.

9. An exhaust gas purifying system as claimed in claim 1, wherein said NOx treating catalyst is arranged to temporarily trap NOx in the lean exhaust gas atmosphere and release and reduce NOx upon being supplied with the reducing agent from said exhaust composition regulating device.

10. An exhaust gas purifying system as claimed in claim 9, wherein said NOx treating catalyst includes at least one element selected from the group consisting of platinum, palladium and rhodium, and at least one element selected from the group consisting of cesium, barium, sodium, potassium, magnesium, lanthanum and calcium.

11. An exhaust gas purifying system as claimed in claim 1, wherein said NOx treating catalyst is arranged to reduce NOx in a lean exhaust gas atmosphere where air-fuel ratio is near the stoichiometric level.

12. An exhaust gas purifying system as claimed in claim 11, wherein said NOx treating catalyst includes at least one element selected from the group consisting of platinum, palladium and rhodium, and at least one element selected from the group consisting of lanthanum, cerium, praseodymium, neodymium and samarium.

13. An exhaust gas purifying system as claimed in claim 12, wherein said NOx treating catalyst includes at least one substance selected from the group consisting of zirconium and barium.

14. An exhaust gas purifying system as claimed in claim 1, wherein said reducing agent is a gaseous atmosphere flowing in the exhaust gas passageway and contains $NH_3$ and $H_2$ serving as reducing components in said NOx treating catalyst.

* * * * *